(12) United States Patent
Kais

(10) Patent No.: US 8,235,188 B2
(45) Date of Patent: Aug. 7, 2012

(54) DAMPING ELEMENT

(75) Inventor: Saadeddin Kais, Bochum (DE)

(73) Assignee: ThyssenKrupp Bilstein Suspension GmbH, Ennepetal (DE)

( * ) Notice: Subject to any disclaimer, the term of this patent is extended or adjusted under 35 U.S.C. 154(b) by 787 days.

(21) Appl. No.: 12/227,464

(22) PCT Filed: Jun. 27, 2007

(86) PCT No.: PCT/EP2007/005685
§ 371 (c)(1),
(2), (4) Date: Nov. 18, 2008

(87) PCT Pub. No.: WO2008/000460
PCT Pub. Date: Jan. 3, 2008

(65) Prior Publication Data
US 2009/0120746 A1    May 14, 2009

(30) Foreign Application Priority Data
Jun. 27, 2006    (DE) .......................... 10 2006 029 380

(51) Int. Cl.
*F16F 9/34*    (2006.01)
*F16F 9/348*    (2006.01)
(52) U.S. Cl. ................ 188/322.15; 188/317; 188/322.22
(58) Field of Classification Search ................... 188/316, 188/317, 322.15, 322.22; 91/228; 92/181 R, 92/181 P
See application file for complete search history.

(56) References Cited

U.S. PATENT DOCUMENTS
3,003,594 A    10/1961    Bourcier De Carbon
(Continued)

FOREIGN PATENT DOCUMENTS
DE    1 979 961    2/1968
(Continued)

OTHER PUBLICATIONS

Reimpell et al., "Fahrwerktechnik: Stoss- und Schwingungsdämpfer," (Chassis technology: Shock and vibration dampers), Vogel Buchverlag, Würzburg, $2^{nd}$ edition, 1989, pp. 49-55. (Spec, p. 4).

(Continued)

*Primary Examiner* — Thomas J Williams
(74) *Attorney, Agent, or Firm* — Collard & Roe, P.C.

(57) ABSTRACT

The invention relates to a damping element for a vibration damper that works with hydraulic damping fluid. The fundamental structure of the damping element includes a one-piece base body configured as a circular disk, which has a plurality of first flow-through openings, each having an entry cross-section in a first face side of the base body, as well as a plurality of second flow-through openings, each having an entry cross-section in an opposite, second face side of the base body, as well as circular valve disks on both face sides of the base body, which rest against a support surface of the base body, disposed in the center, and at least partially close off exit cross-sections of the flow-through openings. The exit cross-sections are surrounded by control edges, which form contact surfaces for the valve disks and project beyond the support surface as well as the entry cross-sections. The height of the control edges increases with an increasing radial distance from the center point of the base body in the form of a circular disk. According to the invention, the flow-through openings have a flow channel section that is preferably cylindrical and opens into a larger exit cross-section bordered by the control edges.

13 Claims, 13 Drawing Sheets

U.S. PATENT DOCUMENTS

Figure 4:
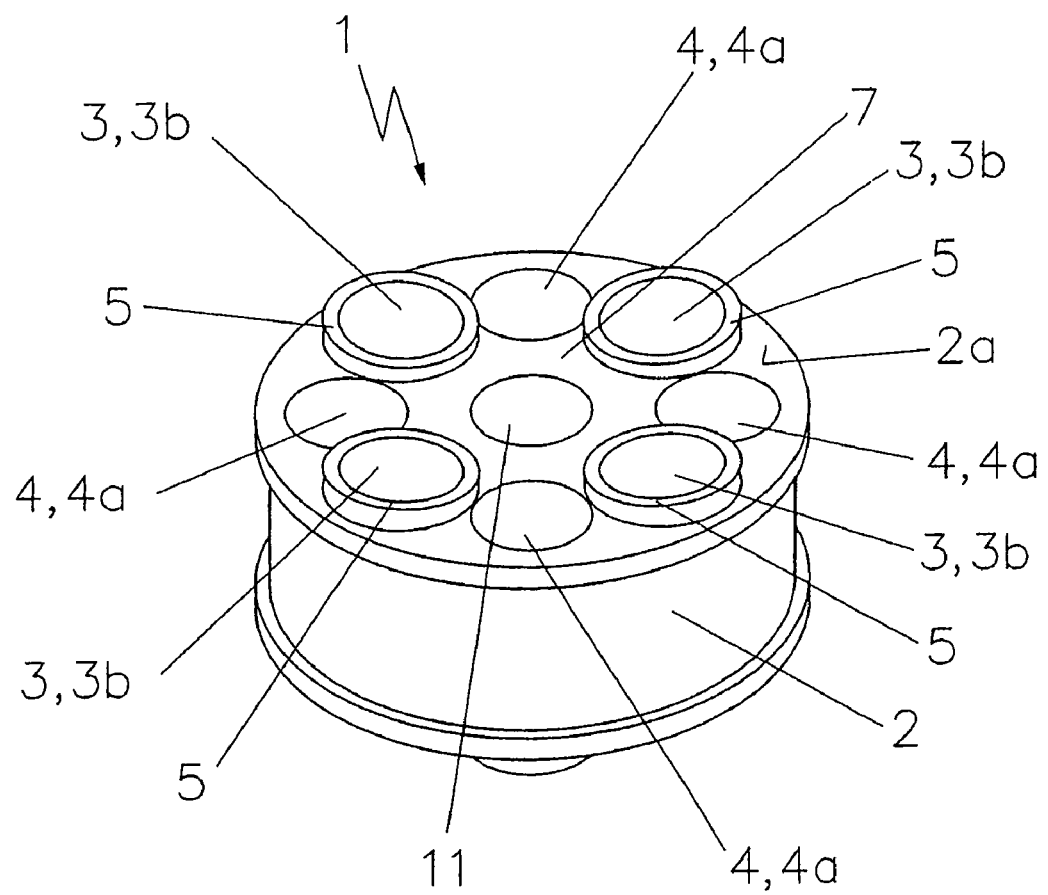

| | | | | |
|---|---|---|---|---|
| 5,259,294 A | * | 11/1993 | May | 188/322.15 |
| 5,529,154 A | * | 6/1996 | Tanaka | 188/282.6 |
| 6,116,388 A | * | 9/2000 | Bataille et al. | 188/322.15 |
| 6,540,052 B2 | | 4/2003 | Fenn et al. | |
| 7,310,876 B2 | | 12/2007 | May et al. | |

FOREIGN PATENT DOCUMENTS

| | | | |
|---|---|---|---|
| DE | 2 057 276 | | 1/1972 |
| DE | 2 103 153 | | 8/1972 |
| DE | 4139746 A1 | * | 6/1993 |
| DE | 43 43 614 | | 1/1995 |
| DE | 100 05 180 | | 8/2001 |
| DE | 102 45 404 | | 4/2004 |
| EP | 0 336 692 | | 10/1989 |
| FR | 1 545 406 | | 11/1968 |
| GB | 2207977 A | * | 2/1989 |

OTHER PUBLICATIONS

International Search Report.

* cited by examiner

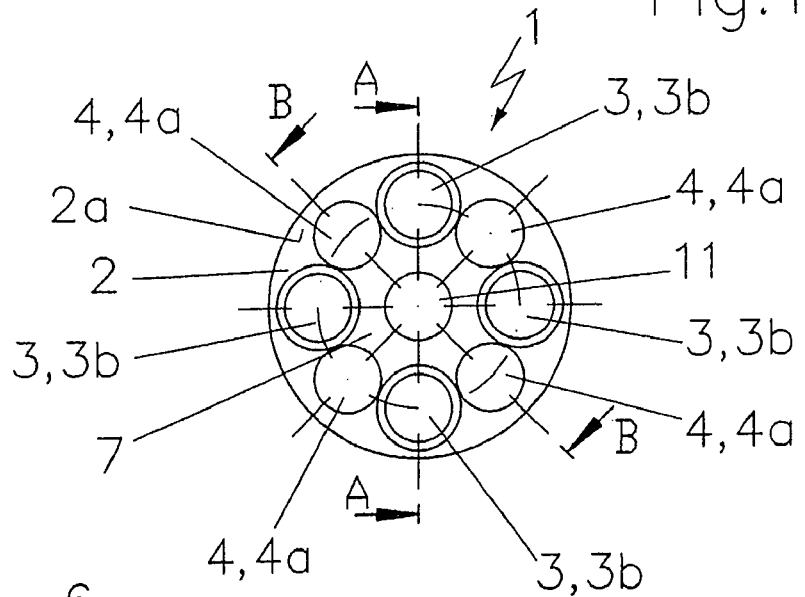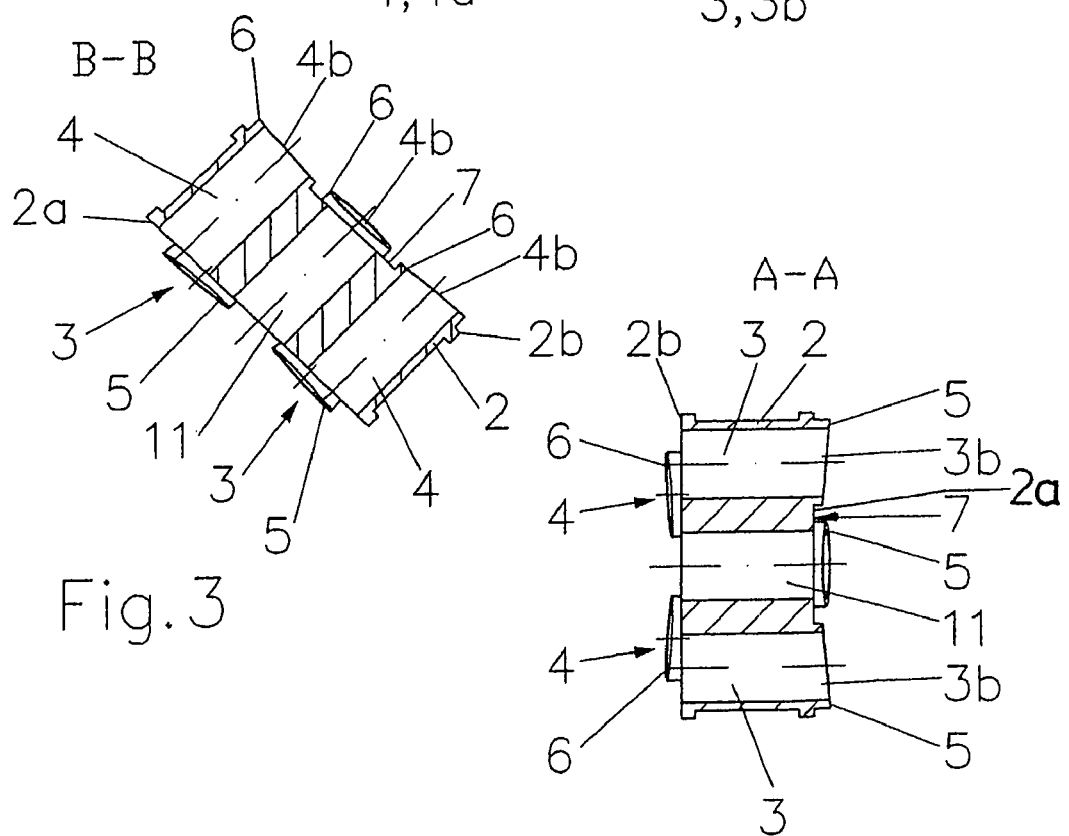

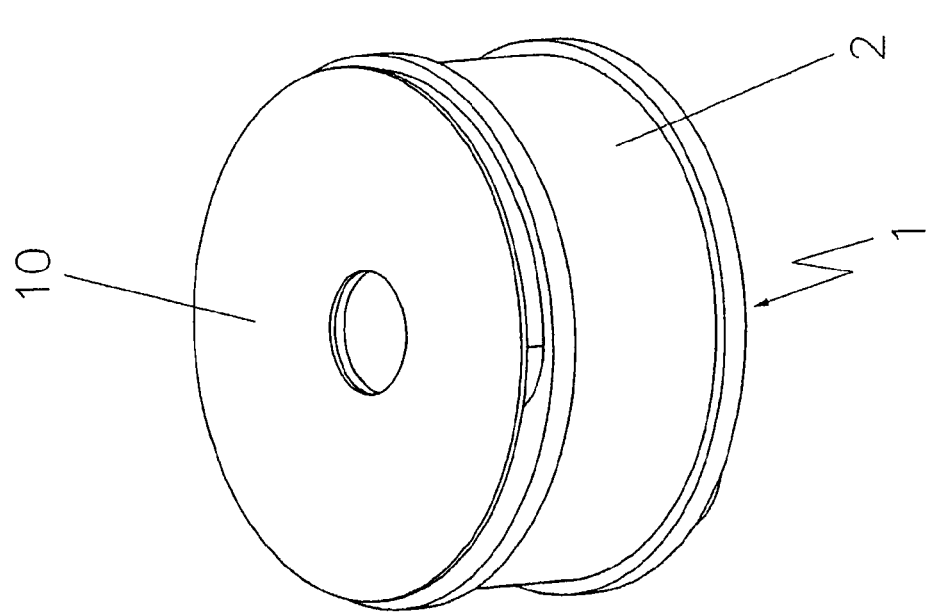
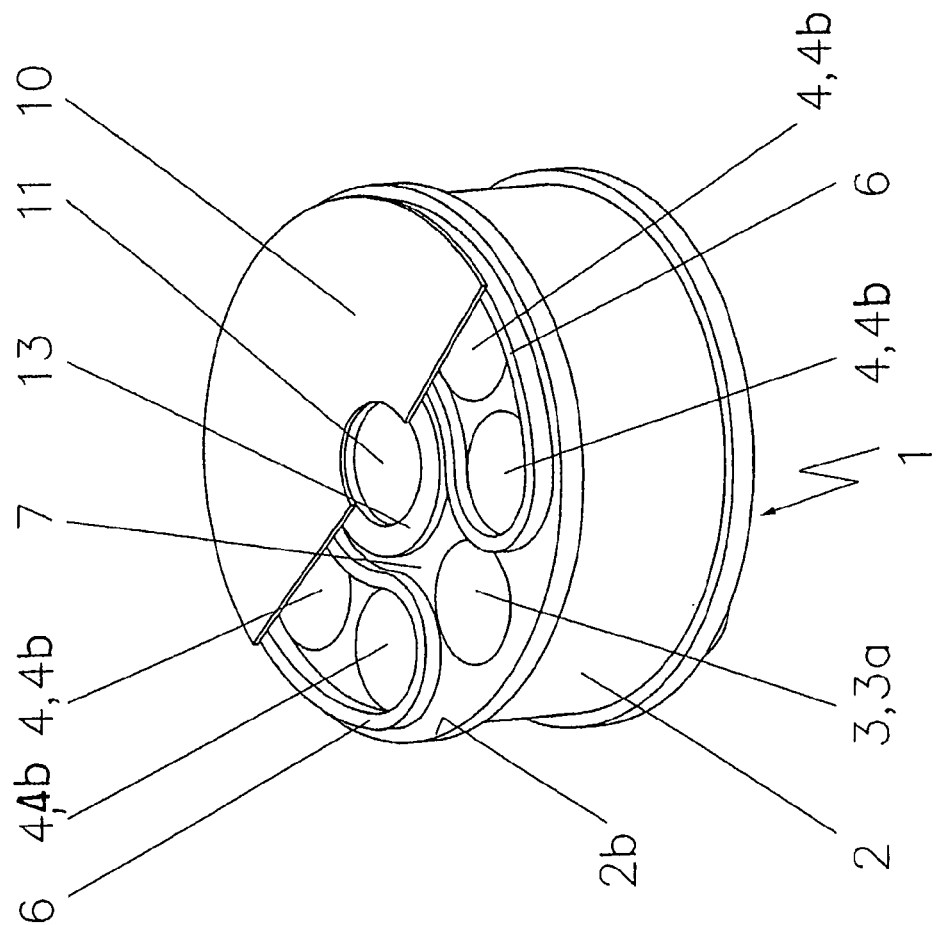
Fig. 11
Fig. 12

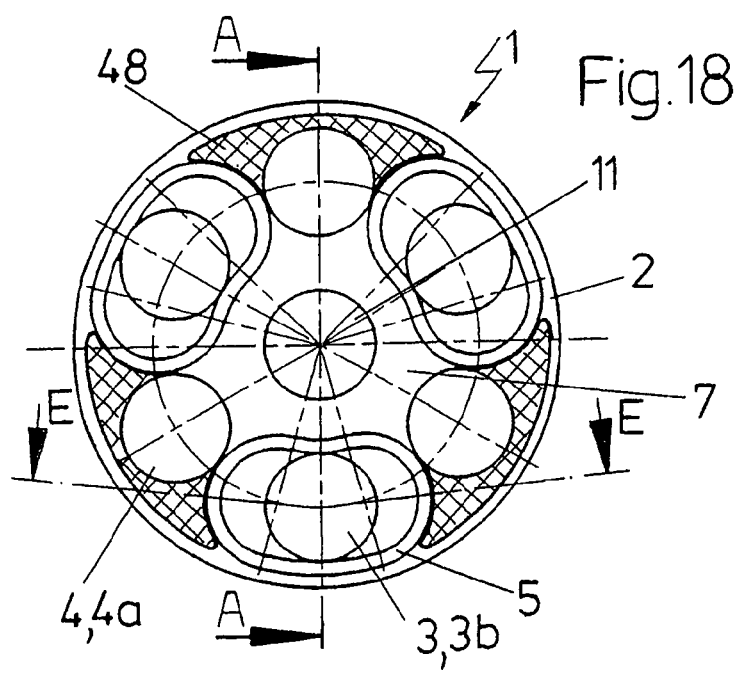
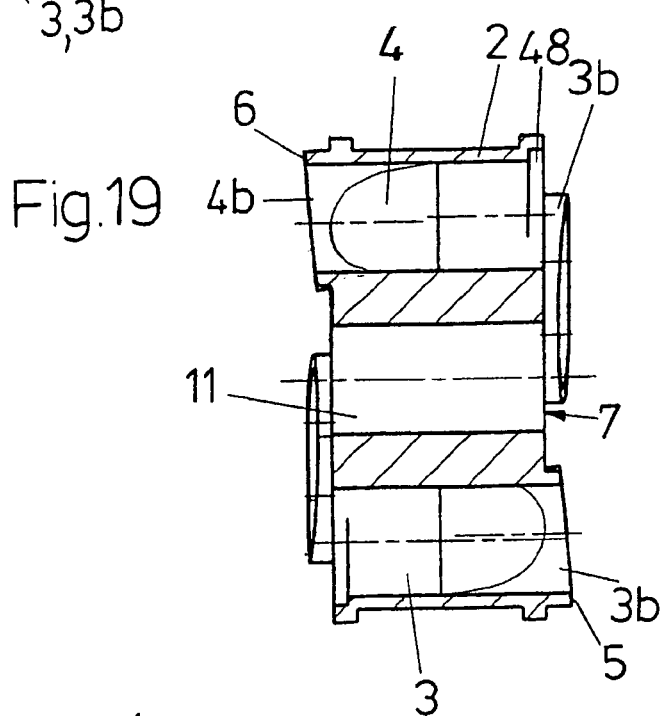
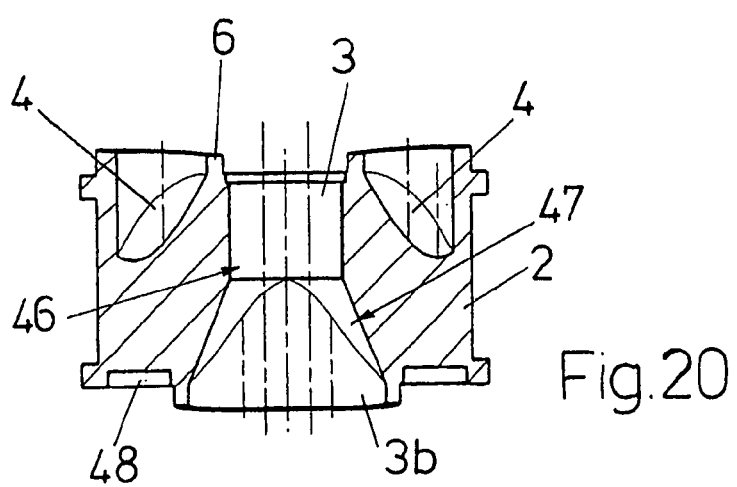

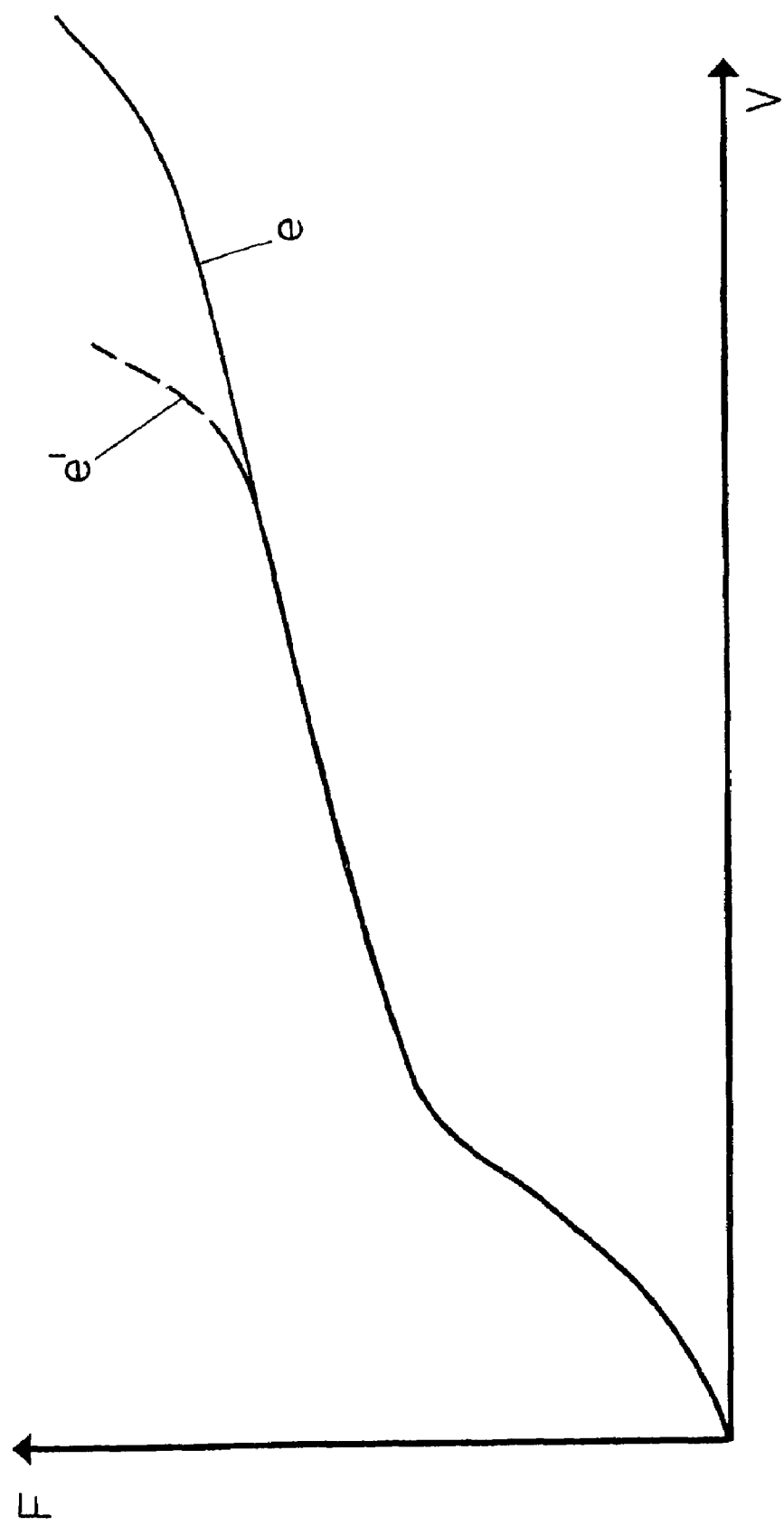

DAMPING ELEMENT

CROSS REFERENCE TO RELATED APPLICATIONS

This application is the National Stage of PCT/EP2007/005685 filed on Jun. 27, 2007, which claims priority under 35 U.S.C. §119 of German Application No. 10 2006 029 380.0 filed on Jun. 27, 2006. The international application under PCT article 21(2) was not published in English.

The invention relates to a damping element for a vibration damper that works with a hydraulic damping fluid. Such damping elements are used as damping valve bodies or also as damping pistons in hydraulic and hydropneumatic vehicle vibration dampers, for example, with which the movements of the vehicle body are damped. The damping behavior of the wheel suspension and thus also the driving comfort that can be achieved at specific damper piston speeds is adjusted, i.e. influenced by means of such damping elements.

The fundamental structure of the damping element includes a monolithic base body configured as a circular disk, which has a plurality of first flow-through openings, each having an entry cross-section in a first face side of the base body, as well as a plurality of second flow-through openings, each having an entry cross-section in an opposite, second face side of the base body, as well as circular valve disks on both face sides of the base body, which rest against a support surface of the base body, disposed in the center, and at least partially close off exit cross-sections of the flow-through openings. The exit cross-sections are surrounded by control edges, which form contact surfaces for the valve disks and project beyond the support surface as well as the entry cross-sections. The height of the control edges increases with an increasing radial distance from the center point of the base body in the form of a circular disk.

A damping element having the characteristics described above is known from DE 20 57 276. The known damping element contains two flow-through openings, through which flow can take place in a first direction, as well as two additional flow-through openings offset by 90° relative to these, through which flow takes place in the opposite direction. Rectangular valve disks are disposed on the face sides of the damping element, and held in a defined position by means of locking straps. However, it is also supposed to be possible to use circular valve disks. However, when using circular valve disks, there is the risk that the valve disks under which flow takes place on the way to the inlet cross-sections might bend under the effect of a flow-related local pressure drop, and thus might markedly change the basic resistance of the damping element.

A damping element is known from DE 19 79 961, which is equipped with rectangular valve disks. The valve disks are disposed in crossed manner. Proper functioning of the damping element is only guaranteed if the rectangular valve disks are aligned precisely during their installation, and centering of the disks can be guaranteed over the entire lifetime of the damping element. Furthermore, when using rectangular spring disks, it is difficult to achieve damping characteristic lines having high force values.

Furthermore, in DE 100 05 180 C1, a damping element is described, whose disk-shaped base body is produced as an embossed punched part. Due to the method of production, the valve body regions that are elevated on the damper valve side are configured as depressions on the axially opposite valve side. Accordingly, the flow-through openings have a cross-section that remains the same from the entry cross-section to the exit cross-section. Furthermore, the control edges are oriented plane-parallel to the face side of the base body. In order to be able to assure a sufficient closing force of the valve disks, they must be biased against the valve contact surface by means of an additional spring element.

In the case of a damping element having the characteristics described initially, the valve disks disposed on the two face sides, with which the exit openings of the passage channels are covered, at least in part, interact with the flow-through openings in a flow-through direction, in the manner of a spring-loaded pressure limiting valve, which opens when a specific opening pressure is reached, i.e. at a specific damper piston speed, and only then develops its damping effect. In the opposite flow-through direction, the valve disks act as kick-back valves. This valve arrangement represents the construction of spring-force-impacted damping valves, well known to a person skilled in the art, with which so-called degressive damping force progressions are achieved (cf. for example Reimpell/Stoll: "Fahrwerktechnik: Stoss- und Schwingungsdämpfer" [Chassis technology: Shock and vibration dampers], Vogel Buchverlag [publishing company] Würzburg, $2^{nd}$ edition, 1989, pages 49 to 51). In general, a degressive damping force progression is understood to be a progression of the damping characteristic line in the force/velocity diagram (F-v diagram) in which the damping force at first increases steeply in a first characteristic line section, at low damper piston speeds, and which then makes a transition into a characteristic line section that rises more or less flatly and runs essentially linearly, at a damper piston speed that continues to increase.

In practice, relatively low damping forces (F values in the F-v diagram) are required at low damper piston speeds, i.e. at low v values in the F-v diagram, which are present during quiet driving on a level asphalt route, for example, so that the greatest possible driving comfort is achieved in the range of low damper piston speeds. At the same time, the damping effect in the range of high damper piston speeds is supposed to be great, in order to guarantee sufficient driving stability of the vehicle, among other things. The known arrangements offer only comparatively slight possibilities for adapting the damping behavior of the vibration damper to the requirements set. In the determination of the spring stiffness of the valve disks and/or their bias, a compromise must always be found, which guarantees sufficient driving stability at high damper piston speeds, on the one hand, and sufficient driving comfort at moderate and low damper piston speeds, on the other hand.

Furthermore, in the case of damping elements that have the structure described initially, there is the problem that the valve disks under which flow passes on the flow path to the entry cross-sections are exposed to a flow-related local pressure drop according to the Bernoulli effect. The pressure drop can lead to bending of the spring disks, which changes the basic resistance in undefined manner, as a function of the flow velocity.

Against this background, the invention is based on the task of further developing a damping element, in such a manner that while a simple design structure is maintained, the damping behavior of the damping element can be better adapted to the requirements set, in defined manner. A damping force progression in the F-v diagram is aimed at, which is characterized by a flat degression curve progression over a great velocity range. Furthermore, it is supposed to be possible to set the transition range between low and high damping in such a manner that an optimum of driving comfort can be guaranteed in the range of an average damping force velocity.

This task is accomplished by means of a damping element according to the invention. Advantageous further developments are discussed below.

In the case of the invention, it is provided that the control edges project beyond the support surface, and that the height by which the control edges project beyond the support surface increases with an increasing radial distance from the center point of the base body in the form of a circular disk. In this way, the axial distance that the control edges have from the support surface increases in the radial direction. The valve disks are braced against the support surface of the base body by means of a bracing element, so that the valve disks that lie against the control edges bend and lie tightly against the face surface of the control edges. In this manner, a bias force of the valve disks is formed, which determines the opening pressure of the damping valve, or at least helps to determine it. The size of the bias force of the valve disks, and thus the opening pressure of the damping valve, can be adjusted in targeted manner by way of the dimension by which the height increases in the radial direction, and by which the control edges project beyond the support surface.

Because of the configuration of the progression of the control edges relative to the base body, i.e. relative to its support surface, according to the invention, the control edges have a slanted progression that drops towards the center of the base body seen in the direction of the center point of the base body. The face surfaces of the control edges for contact surfaces for the valve disks, whereby the base body of the damping element has support surfaces for the valve disks in the region of its center point, which surfaces are set back in the axial direction, relative to the control edges.

According to a first aspect of the invention, the flow-through openings have a flow channel section that opens into a larger exit cross-section bordered by the control edges. The flow channel section is preferably configured cylindrically. Preferably, it makes a transition into the exit cross-section with a constant widening of its cross-section. The widening of the cross-section can also be configured as a conical surface, or a surface having a convex curvature.

According to the invention, the flow cross-section of the flow-through openings changes from the entry cross-section towards the exit cross-section, whereby the exit cross-section is significantly greater than the flow cross-section of the flow channel section that leads to it. The control edges that border the exit cross-section take on the sealing function for the closing spring disks, which already exists. The sealing length between the valve disk and the base body is increased by means of the circumferential control edge. This has the result that large amounts of hydraulic fluid can flow away even at small disk opening strokes. This results in a soft response with a flat degression curve progression.

The exit cross-sections at the two face sides of the base body preferably have a kidney-shaped outline and are disposed alternating with an entry cross-section, in each instance, in the circumference direction. The preferred embodiment of the invention provides that the base body has six flow-through openings, whereby three exit cross-sections bordered by control edges are disposed alternating with three entry cross-sections.

In a further embodiment, the invention teaches that the entry cross-sections form depressions, relative to the support surface, which extend, on the face side, all the way to the outer edge, or at least to a region of the base body close to the edge, and fill the space between the control edges of adjacent exit cross-sections. The entry cross-section is configured as a gusset-shaped depression, for example, which is delimited by a cylinder section of the passage opening and, on the sides, by the control edges of adjacent exit cross-sections. The basic resistance of the damping element can be clearly reduced by means of the widening of the entry cross-section, according to the invention. As a result, the damping element has a more sensitive response behavior, and the driving comfort of a vehicle whose vibration damper is equipped with the damping elements according to the invention is improved.

In the case of the damping element according to the invention, multiple flow-through openings are provided for each flow-through direction of the damping fluid, i.e. two or more flow-through openings for the tension stage damping and two or more flow-through openings for the pressure stage damping of the vibration damper. The flow-through openings that are active in their flow-through direction, in each instance, have control edges at their exit cross-sections, which, according to another aspect of the invention, project beyond the support surface of the base body to a differing extent, i.e. in which the height by which the control edges project beyond the support surface follows different progressions with an increasing distance from the center of the base body. In this way, a characteristic line progression of the damping force is obtained, which is adapted or can be adapted very well to the damping force progressions required in practice, in the pressure stage and in the tension stage. Furthermore, the possibility exists that the height progressions of the control edges at the exit cross-sections of the first flow-through openings and the second flow-through openings are different.

It is practical if the support surface of the base body is configured in the form of a circular ring. Preferably, the base body has a central bore in its center point, through which a threaded bolt can be inserted. The valve disks can be braced against the support surface of the base body using nuts that can be screwed onto the threaded bolt. In this manner, the valve disks can be attached to the base body, using simple attachment means, in such a manner that they rest tightly on the control edges, with the formation of a bend and thus of a bias force. In this way, the valve disk can be pressed against the control edges with a bias force, without a separate spring element being required to generate the bias force.

The base body of the damping element can be produced, in simple and cost-advantageous manner, as a one-piece sintered component. The control edges can have a local lowering along their circumference, to form a pre-opening cross-section through which flow can always take place. Furthermore, it lies within the scope of the invention that the valve disks are configured as bypass disks.

Figure 5:
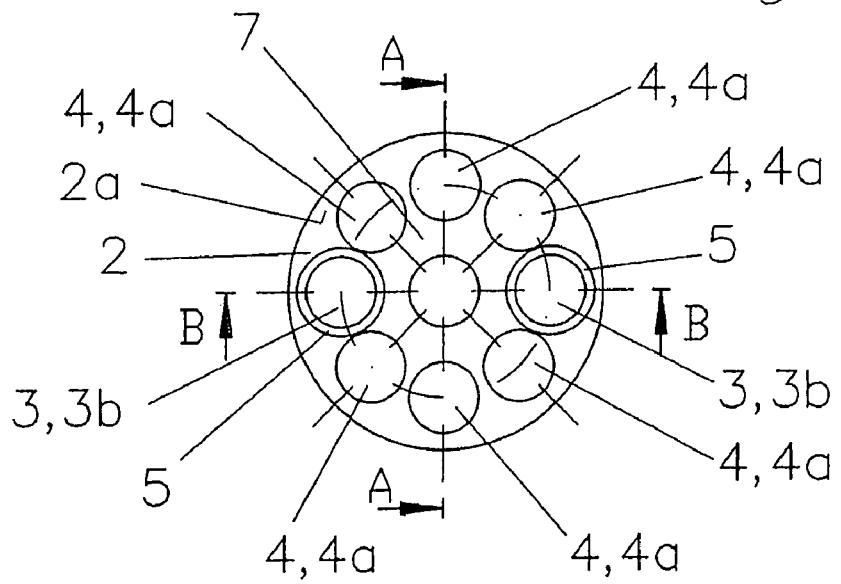
Figure 6:
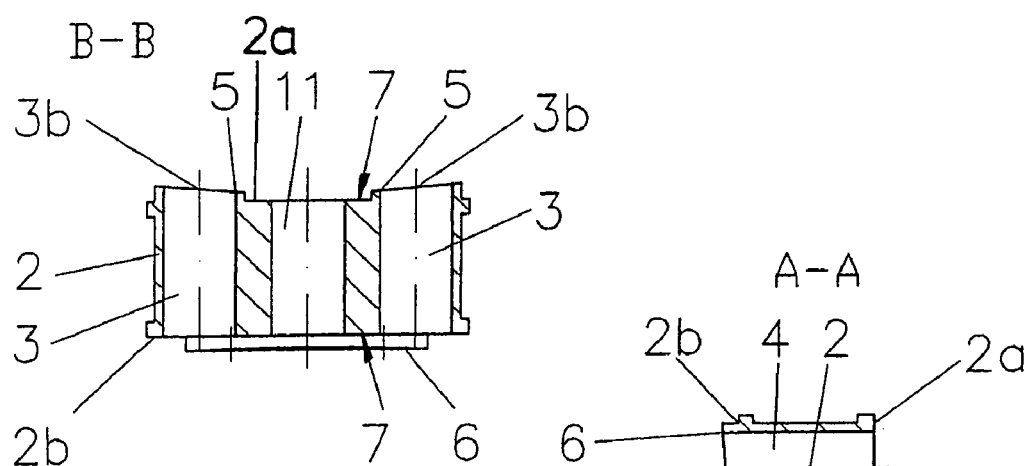
Figure 7:
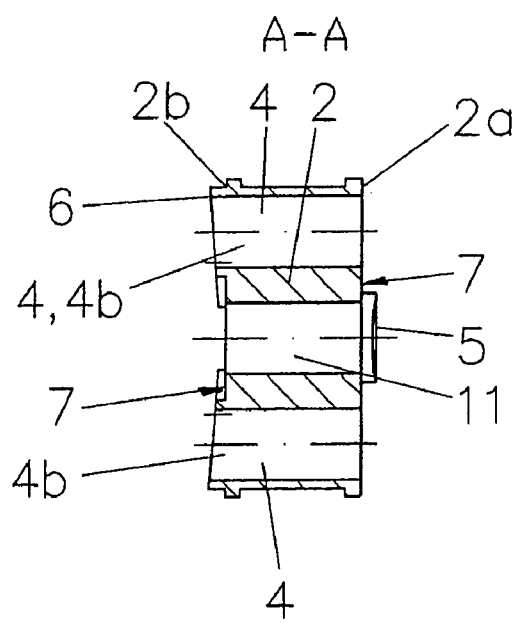
Figure 8:
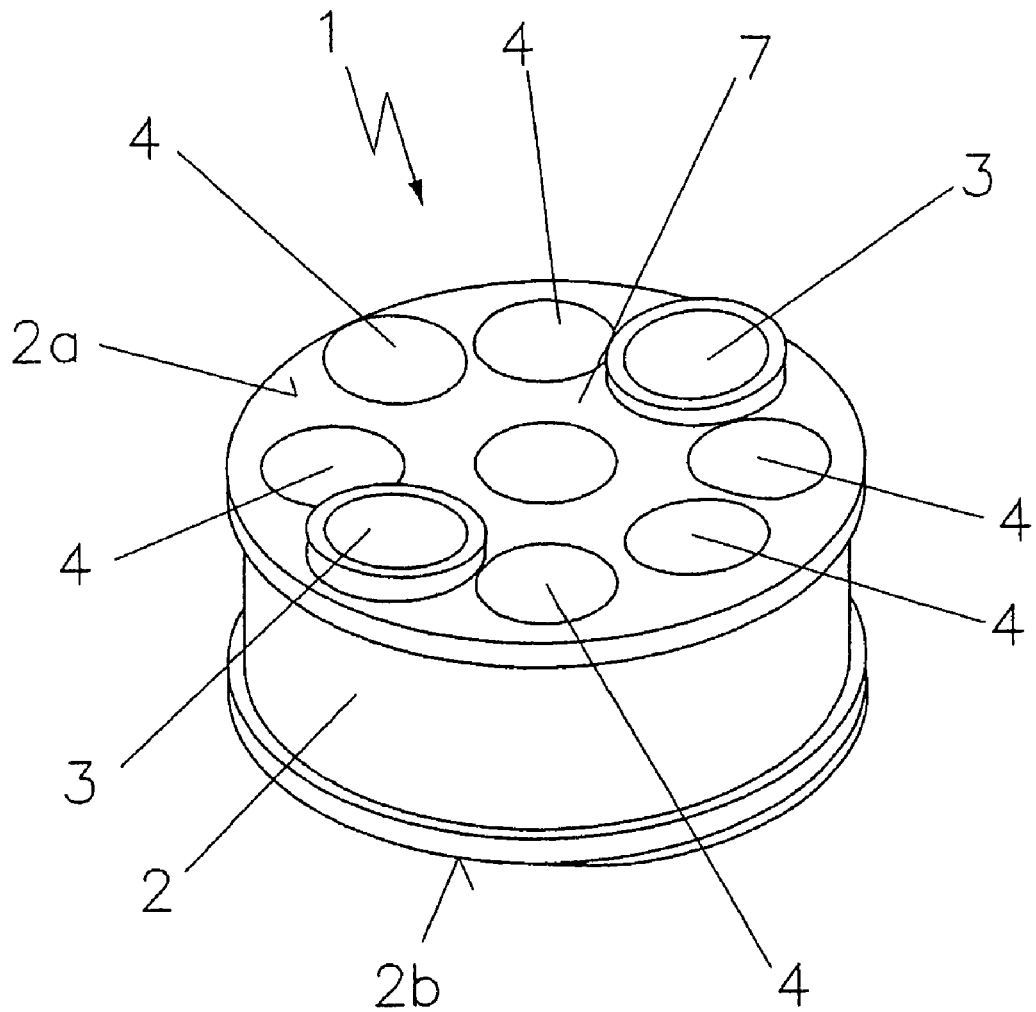
Figure 10:
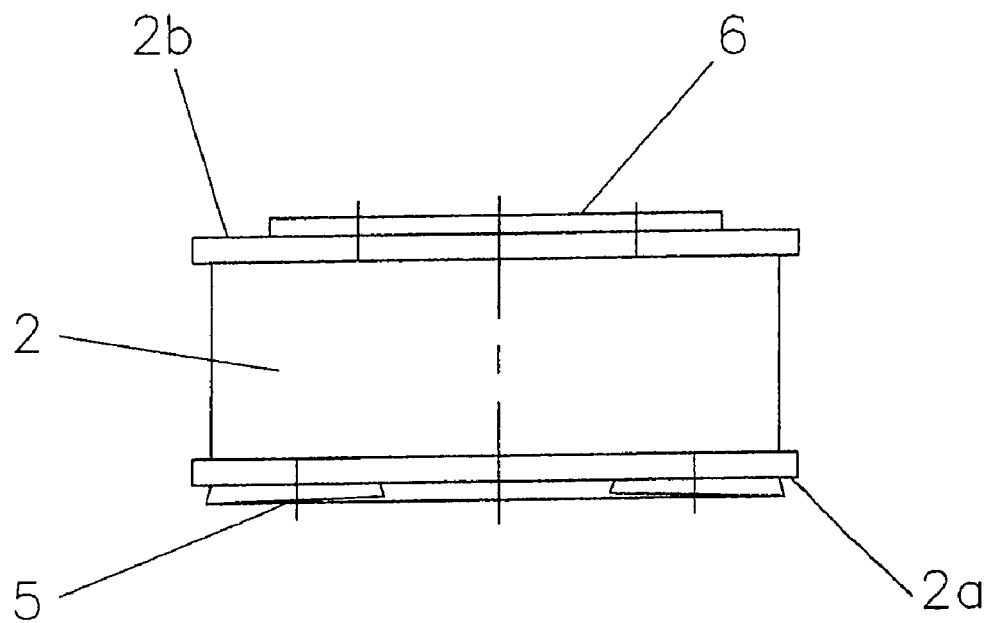
Figure 9:
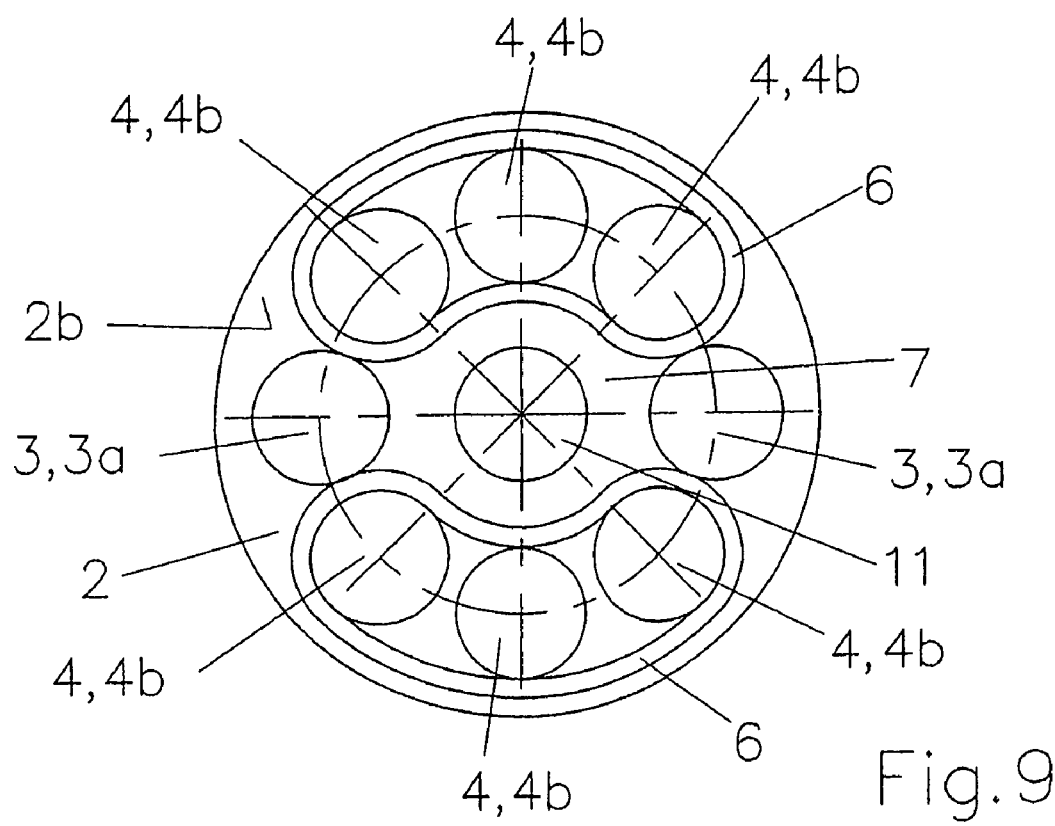
Figure 13:
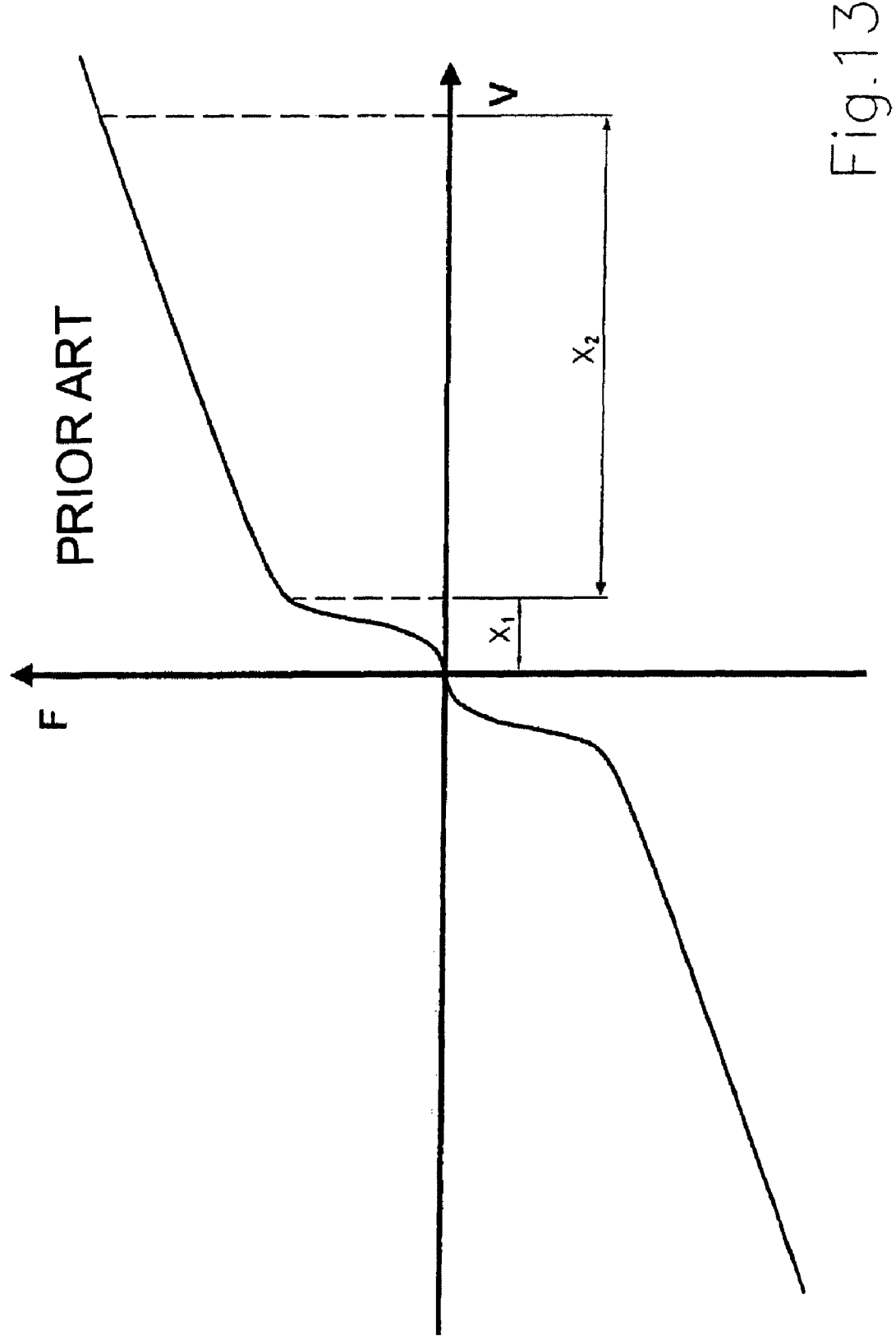
Figure 14:
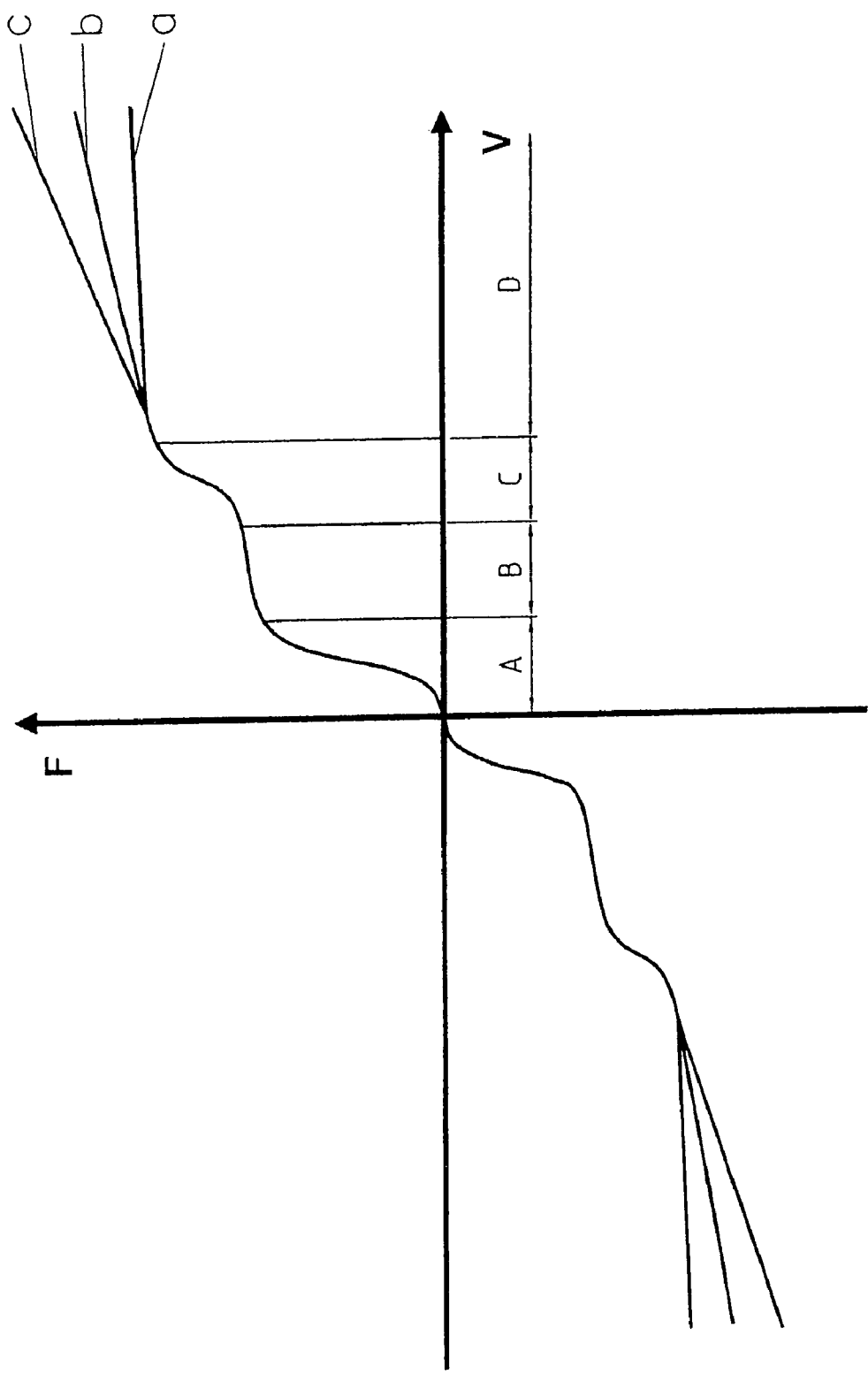
Figure 15:
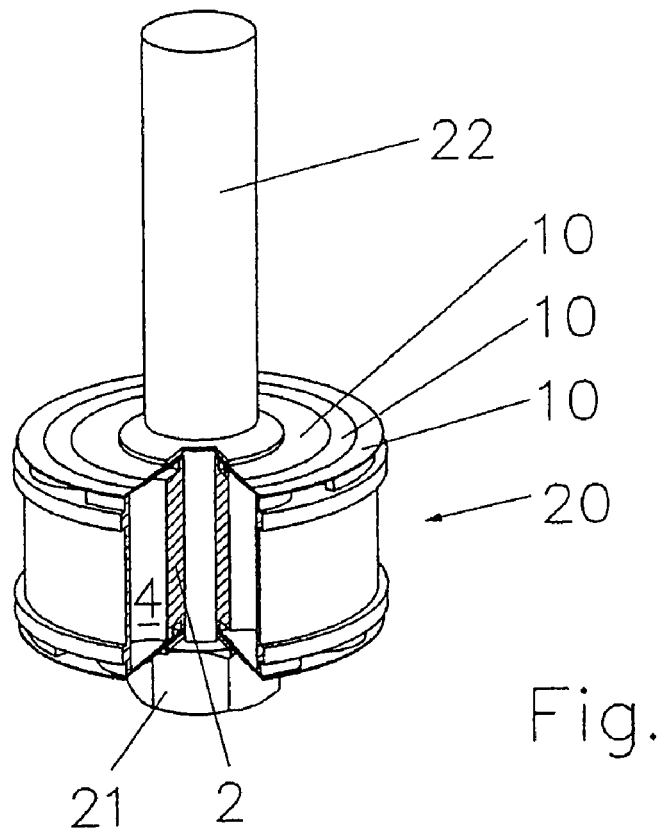
Figure 16:
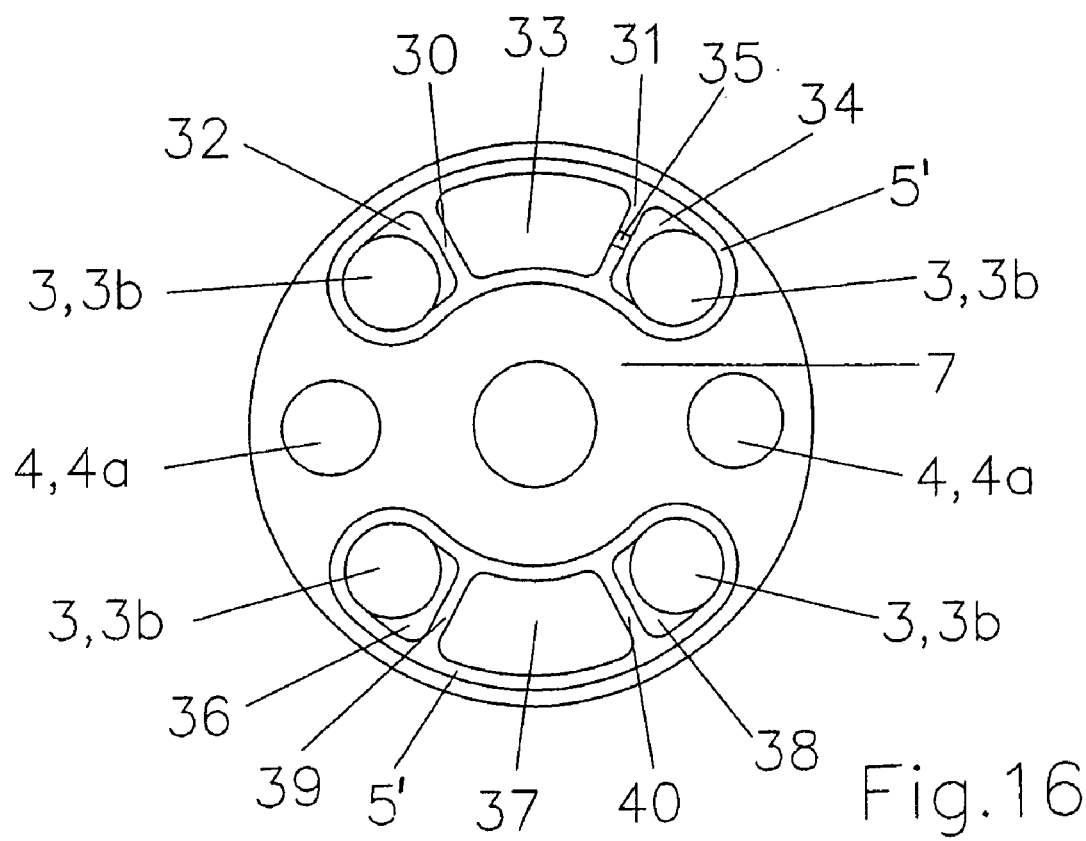
Figures 17A, 17B:
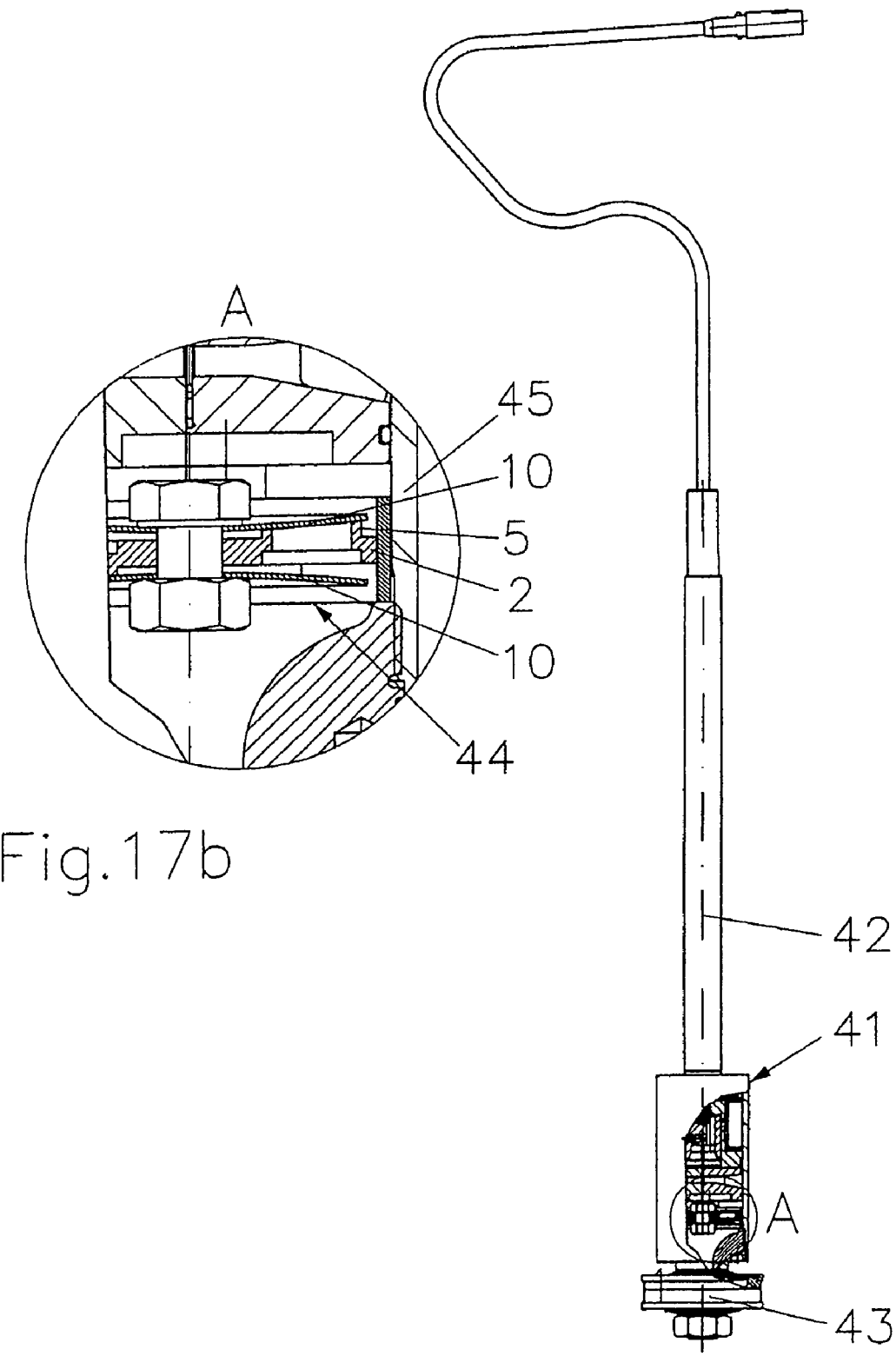
Figure 22:
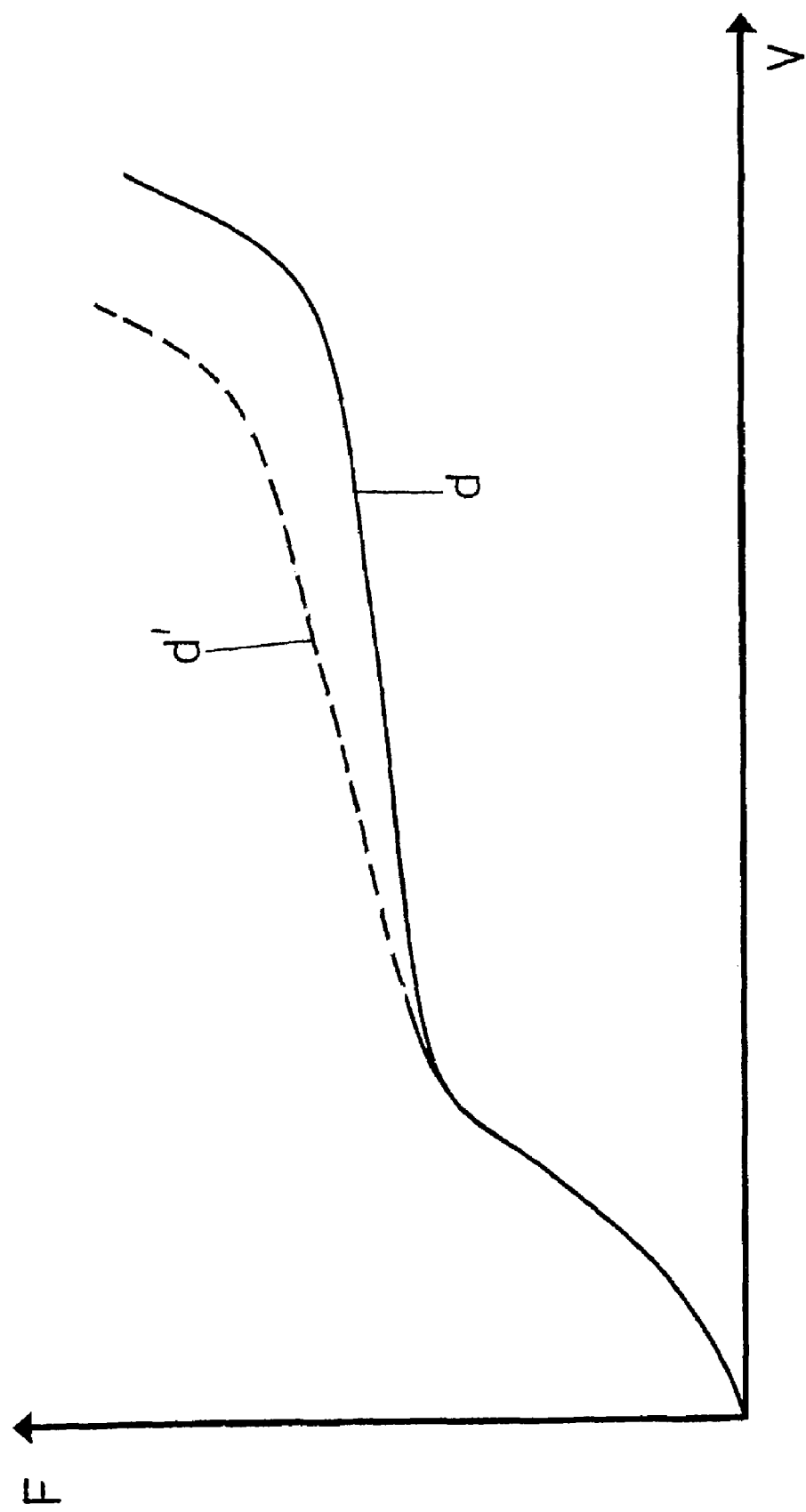

The invention will be described in greater detail in the following, using a drawing that shows an exemplary embodiment. In detail, the drawing shows:

FIG. 1 a damping element having multiple first and second flow-through openings, in a top view;

FIG. 2 an axial half-section along the line A-A according to FIG. 1;

FIG. 3 an axial half-section according to the line B-B in FIG. 1;

FIG. 4 a perspective view of the damping element according to FIG. 1;

FIG. 5 a top view of a damping element according to a second embodiment of the invention, modified as compared with FIG. 1;

FIG. 6 an axial half-section along the line B-B according to FIG. 5;

FIG. 7 an axial half-section along the line A-A according to FIG. 5;

FIG. 8 a perspective view of the damping element according to FIG. 5;

FIG. 9 a top view of the damping element according to FIG. 5, from the other side in comparison with FIG. 5;

FIG. 10 a side view of the damping element according to FIG. 9;

FIG. 11 a perspective view of the damping element according to FIG. 9, with the valve disk partially cut free;

FIG. 12 a perspective view of the damping element according to FIG. 9 with a valve disk;

FIG. 13 a force/velocity diagram with a damping characteristic line that runs degressively, according to the state of the art;

FIG. 14 a force/velocity diagram of a vibration damper equipped with a damping element according to the invention, with a degressive damping force characteristic line modified according to the invention;

FIG. 15 a perspective view of a damping element mounted on a piston rod, as the working piston of a vibration damper;

FIG. 16 a top view of a damping element having specially configured control edges;

FIG. 17a a damping element disposed within a damping force control device, as a comfort valve of a vibration damper;

FIG. 17b a sectional representation of the detail A of the damping element configured as a comfort valve, according to FIG. 17a;

FIG. 18 another embodiment of the base body of a damping element according to the invention, in a top view;

FIG. 19 the section A-A from FIG. 18;

FIG. 20 the section E-E from FIG. 18;

FIGS. 21 and 22 damping force progressions of damping elements according to the invention, in a force/velocity diagram.

FIG. 1 shows a first exemplary embodiment of the invention, in a top view. The damping element 1 according to the invention has a base body 2 in which flow-through openings 3, 4 are disposed. A central bore 11 is disposed in the center of the base body 2, which is shaped as a circular disk. In this exemplary embodiment, the flow-through openings 3, 4 have a circular cross-section. In the exemplary embodiment shown here, four first flow-through openings 3 and four second flow-through openings 4 are shown. The center region of the base body 2, disposed around the bore 11, forms a support surface 7 for the valve disks, not shown, which at least partially cover the flow-through openings.

In the top view shown in FIG. 1, the viewer is looking at the exit cross-sections 3b of the flow-through openings 3 and at the entry cross-sections 4a of the flow-through openings 4. In the installed state, the first flow-through openings 3 only have damping fluid flowing through them when the vibration damper is in tension stage damping. In contrast, the flow-through openings 4 only have damping fluid flowing through them when the vibration damper is in pressure stage damping.

The exit cross-sections 3b of the flow-through openings 3 have control edges 5 that project beyond the surface 2a of the base body 2 in the axial direction. In contrast to this, the entry cross-sections 4a of the flow-through openings 4 do not have any control edges. The entry cross-sections 4a lie in the plane of the surface 2a of the base body 2.

FIG. 2 shows the section through the damping element 1 according to the invention, along the line A-A in FIG. 1. The base body 2 has a surface 2a that forms a continuous surface that is disposed in a plane. The opening cross-section of the central bore 11, which faces the exit cross-sections 3b of the flow-through openings 3, lies within this plane of the surface 2a.

The flow-through openings 3, through which the section shown in FIG. 2 runs, have a circular exit cross-section 3b. The exit cross-section 3b of each flow-through opening 3 has a control edge 5 that projects beyond the surface 2a of the base body 2 in the axial direction.

In FIG. 2, it can easily be seen that the height, i.e. the dimension by which the control edge 5 projects beyond the surface 2a of the base body 2 in the axial direction, increases with an increasing radial distance from the center line of the damping element. In the radially outer region of the damping element, the control edge 5 clearly projects further beyond the surface 2a of the base body 2 than in the radially inner region of the damping element. In this manner, a face surface of the control edge 5 that runs at a slant towards the center of the base body 2 in the shape of a circular disk is made available, which surface forms a contact surface for a valve disk, not shown in FIG. 2.

The surface 2b of the base body 2 that lies opposite the surface 2a of the base body 2 is axially set back relative to the control edges 6 of the flow-through openings 4. The section shown in FIG. 2 does not run through the flow-through openings 4, but rather exclusively through the flow-through openings 3 and the central bore 11 of the damping element 1. In FIG. 2, it can be clearly seen that the control edges 6, which are disposed at the exit cross-sections 4b of the flow-through openings 4, also project beyond the surface 2b of the base body 2. In this connection, the height, i.e. the dimension by which the control edges 6 project beyond the surface 2b, increases with an increasing radial distance from the center line of the damping element 1. In this manner, the control edges 6 form a contact surface that runs at a slant towards the center line of the damping element 1, for a valve disk, not shown in FIG. 2.

FIG. 3 shows the section along the line B-B according to FIG. 1. This section runs through the flow-through openings 4 and the central bore 11 of the damping element 1. The base body 2 has a surface 2b assigned to the exit cross-sections 4b of the flow-through openings 4. The exit cross-sections 4b have control edges 6 that project beyond the surface 2b of the base body 2 in the axial direction. Again, the dimension by which the control edges 6 project beyond the surface 2b of the base body 2 increases in the radial direction, with an increasing distance from the center line of the base body 2. This means that the control edge 6 projects more greatly beyond the surface 2b of the base body 2 in the radially outer region of the base body 2 than in the radially inner region of the base body 2.

On the side of the base body 2 that lies opposite the surface 2b, its surface 2a is disposed. The control edges 5 of the exit cross-sections 3b of the flow-through openings 3 can be seen. The opening cross-sections of the central bore 11 lie in the surfaces 2b and 2a, respectively, of the base body 2.

FIG. 4 shows a perspective view of the damping element 1. It can easily be seen that the entry cross-sections 4a of the flow-through openings 4 lie in a plane with the surface 2a of the base body 2. In contrast, the exit cross-sections 3b of the flow-through openings 3 have control edges 5 that project beyond the surface 2a of the base body 2 in the axial direction. The outer mantle surface of the base body 2 has a groove-shaped region into which a sealing cuff can be set. This would be necessary, for example, if the sealing element is used as a working piston of a vibration damper. The damping element would then be sealed relative to the pressure pipe of the vibration damper, by way of the sealing cuff, so that the damping element divides the interior of the pressure pipe into two work chambers that are sealed relative to one another.

In FIG. 4, it is clearly evident that the entry cross-sections 4a of the flow-through openings 4 lie in the same plane as the surface 2a of the base body 2, while the control edges 5, which drop towards the center of the base body 2, make slanted contact surfaces for a valve disk, not shown in FIG. 4, available. The valve disk, not shown, can be braced against the support surface 7 of the base body 2 by way of bracing elements not shown in FIG. 4, in its center region, i.e. in the region of the central bore 11. In this manner, a targeted bias is formed between the valve disk and the control edges 5, on which it rests, forming a seal. The valve disk is biased by means of the progression of the control edges 5, which changes, i.e. increases in the radial direction, with an increasing radial distance from the center of the base body 2, in such a manner that the valve disk only lifts off the control edges 5 when a certain pressure, i.e. a certain damper piston speed has been reached, and thus releases a flow-through cross-section through the flow-through openings 3. The bias and thus the opening pressure of the valve disk can be varied and thereby adjusted in targeted manner by way of varying the height change of the control edges 5 as a function of the radial distance from the center of the base body 2.

FIG. 5 shows a second embodiment of the invention, in a top view. The surface 2a of the base body 2 that faces the viewer again has multiple first flow-through openings 3 and multiple second flow-through openings 4 passing through it. Two first flow-through openings 3 and a total of six second flow-through openings 4 are present.

The first flow-through openings 3 have exit cross-sections 3b disposed on the surface 2a of the base body 2, which in turn have control edges 5. These control edges 5 project beyond the surface 2a of the base body 2 in the axial direction. The entry cross-sections 4a of the flow-through openings 4, in contrast, lie in a plane with the surface 2a of the base body 2. No control edges are formed at the entry cross-sections 4a of the flow-through openings 4.

FIG. 6 shows the section along the line B-B of FIG. 5. At the surface 2a of the base body 2, the exit cross-sections 3b of the flow-through openings 3 have circumferential control edges 5. The central passage bore 11 of the base body 2 is disposed in the center of the damping element. The opening cross-sections of the passage bores 11 lie in the plane of the surfaces 2a, 2b of the base body 2. Proceeding from the center line of the base body 2, the height by which the control edges 5 project beyond the surface 2a of the base body 2 increases with an increasing radial distance, so that a circular contact surface that drops at a slant from the radial outside towards the center of the base body 2 is formed by the face surface of the control edge 5. In the installed state, a valve disk, not shown in FIG. 6, lies on this contact surface, forming a seal.

The support surface 7 is disposed around the central passage bore 11, in the form of a circular ring. The valve disk can support itself on this support surface 7.

In order to achieve the desired bias of the valve disk, a threaded bolt is inserted through the central bores of the valve disks and the central passage bore 11 of the base body 2. The valve disks are then braced against the ring-shaped support surface 7, using at least one nut that can be screwed onto the threaded bolt. In this manner, the valve disk is bent in such a manner that it assumes the desired bias, and at the same time lies on the face surfaces of the circumferential control edges 5, forming a seal.

On the surface 2b of the base body 2 that lies opposite the surface 2a, the base body according to FIG. 6 has a control edge 6 that is disposed on the exit cross-section of the flow-through channels 4. The damping element 1 according to the second embodiment of the invention, with its surface 2b, is shown in a top view in FIG. 9. It can easily be seen that in each instance, the kidney-shaped control edges 6 enclose three flow-through openings 4, each having circular exit cross-sections 4b, which are separated from one another. It is understood that more than three flow-through openings 4 having exit cross-sections 4b could also be disposed within the region of the base body 2 enclosed by the kidney-shaped control edges 6. Likewise, it is, of course, possible that the entire region enclosed by the circumferential kidney-shaped control edges 6 forms a single, continuous opening.

Also with regard to the kidney-shaped control edges 6, the height by which these control edges project beyond the surface 2b of the base body 2 increases with an increasing radial distance from the center point of the base body 2. This can easily be seen in FIG. 7.

In FIG. 10, the damping element configured according to the second embodiment of the invention is shown in a side view.

FIG. 8 shows the damping element according to the invention, according to the second embodiment of the invention, in a perspective view.

In FIG. 11, the damping element 1 according to the invention, according to the second embodiment of the invention, is shown in a perspective view, in an enlarged representation. The base body 2 with its surface 2b can easily be seen. The entry cross-section 3a of the flow-through opening 3 lies in the plane of the surface 2b. The kidney-shaped control edges 6 project beyond the surface 2b in the axial direction. The control edges 6 surround the exit cross-sections 4a of the flow-through openings 4.

A central passage bore 11 is disposed in the center of the base body 2. The support surface 7, on which the valve disk 10 can support itself, is disposed in ring shape around the central passage bore 11. In the exemplary embodiment shown in FIG. 11, only half of the valve disk 10 is shown, in order to clear the view of the support surface 7 and the washer 13 that lies on this support surface 7. The surface of the washer 13 that faces the valve disk 10 projects less beyond the surface 2b of the base body 2, i.e. beyond the support surface 7 in the axial direction, than the section of the circumferential control edge 6 disposed radially on the inside. In this way, it is assured that the inner circumference of the valve disk 10 is braced against the support surface 7, by way of the bracing elements not shown in FIG. 11, in such a manner that the valve disk 10 bends and, at the same time, lies on the entire circumference of the control edge 6, forming a seal. The washer 13 is interchangeable, so that the thickness of the washer 13 can be adapted to the thickness of the valve disk and its resilience properties, i.e. bias properties, which are decisively dependent on the thickness of the valve disk and its material properties.

FIG. 12 shows the damping element according to FIG. 11 with the complete valve disk 10.

FIG. 13 shows a force/velocity diagram with a damping force characteristic line that runs degressively, according to the state of the art. The progression of the damping force characteristic line shown in FIG. 13 is the typical progression, which is present when a damping element having biased damping valves in the form of valve spring disk packages is used. A first characteristic line section $X_1$ that runs essentially in the shape of a parabola can be seen. The deciding factor for the progression of this characteristic line section $X_1$ is the so-called pre-opening cross-section of the damping valve. This pre-opening cross-section has a hydraulic resistance that acts in the manner of a hydraulic shutter, and the damping effect of this pre-opening cross-section is characterized by the progressive increase in the damping force with an increasing damping piston speed. At the end of the characteristic line section $X_1$, the damping characteristic line makes a transition into a characteristic line section $X_2$, which runs in essentially linear manner. This occurs because the damper piston speed present at the end of the section $X_1$ has reached the point at which the biased damping valve opens and in this way releases a larger flow-through cross-section for the damping fluid. The fundamentals of these damping force progressions, which are well known from the state of the art, can be found, for example, in the textbook by Reimpell/Stoll: "Fahrwerktechnik: Stoss- und Schwingungsdämpfer" Vogel Buchverlag Würzburg, $2^{nd}$ edition, 1989, pages 49 ff.

The incline of the damping characteristic line in section $X_2$ is determined by the spring stiffness of the valve disk, i.e. of the valve disk package. Therefore, if, on the one hand, low damping forces are to be achieved in the characteristic line section $X_1$, in order to increase the driving comfort, and, on the other hand, high damping forces are to be achieved in the end region of the characteristic line section $X_2$, which lies at high v values, in order to achieve sufficient driving stability, it must be accepted that relatively great damping forces are generated in the region of moderate damping piston speeds, in other words in the middle region of the section $X_2$. In this region, therefore, less driving comfort has to be accepted.

In contrast, it is possible, using the damping element according to the invention, to generate damping characteristic line progressions that clearly deviate from the well-known progression of the damping characteristic lines according to FIG. 13. For example, a damping force characteristic line progression can be achieved as it is shown in FIG. 14. The damping characteristic line shown in this FIG. 14 has four characteristic line sections A, B, C, D. The first characteristic line section A is comparable with the characteristic line section $X_1$ shown in FIG. 13. Likewise, the characteristic line section designated as B in FIG. 14 is comparable with the characteristic line section designated as $X_2$ in FIG. 13. Beyond this, however, the characteristic line according to FIG. 14 also has other, additional sections, namely another characteristic line section C and a subsequent further characteristic line section D.

In the case of the invention, the damping force generated in section A (in other words at low damper piston speeds) can be adjusted to be low, and, at the same time, a damping force that is also moderate can be adjusted in sections B and C, i.e. at moderate values of the damper piston speed. Thus, great driving comfort is achieved in the regions A, B, and C, in each instance. The high damping force required to achieve the necessary driving stability at high damper piston speeds is only generated in section D of the damping characteristic line. In the case of the invention, the v values at which the sections A, B, and C end, in each instance, can be influenced, i.e. adjusted in targeted manner, by means of modification of the progression of the control edges 5, 6. Therefore the damping force progression of a vibration damper that has a damping element according to the invention can be flexibly adapted to the values required in an individual case, in the tension and pressure stage, independent of one another.

The characteristic line progression shown in FIG. 14 can be achieved in that in the case of a damping element 1 shown in FIG. 5 described above, for example, the two flow-through openings 3 have a control edge 5 that increases differently, relative to one another, in the radial direction, with an increasing radial distance. In other words: The height by which the control edge 5 shown in FIG. 5 on the left (i.e. at nine o'clock) projects beyond the surface 2a of the base body 2 increases, with an increasing radial distance from the center point of the base body 2, to a lesser degree than the control edge 5 shown on the right side (i.e. at 3 o'clock) in FIG. 5. By means of the different degree of increase of the projection height, the result is achieved that the bias of the valve disk 10 is greater in the region of the control edge 5 that projects more greatly than the bias of the valve disk in the region of the control edge 5 that projects less greatly. This brings about the result that the valve disk lifts off the control edges, in each instance, one after the other, as different values of the damper piston speed are reached, and thus releases larger flow-through cross-sections, one after the other.

Section A of the damping force characteristic line shown in FIG. 14 is defined analogous to the progression according to FIG. 13, by the pre-opening cross-section that the damping valve has. The pre-opening cross-section can be represented, for example, by a gap or a recess in the circumferential control edge 5, 6 of the flow-through openings 3, 4 or in the valve disk 10. When a certain value of the damper piston speed is reached, the valve disk 10 lifts up only in the region of the control edge 5, 6 that projects less greatly beyond the surface 2a, 2b of the base body 2. In this way, a larger flow-through cross-section for the damping fluid is released, so that (analogous to FIG. 13) the damping characteristic line section B, which runs in essentially linear manner, results. At some point, a value for the damper piston speed is reached at which bending of the valve disk 10 in the region of the control edge 5, 6 that projects less greatly is so great that the free flow-through cross-section of the related flow-through opening 3, 4 determines the size of the hydraulic resistance of the damping valve. In this range, the damping characteristic line then has the progression according to section C in FIG. 14. The progression of the characteristic line in section C is therefore brought about by the hydraulic flow-through resistance of the flow-through opening 3, 4 that has the control edge 5, 6 that projects less greatly, acting in the manner of an orifice.

If the damper piston speed continues to increase, it achieves a value at which the valve disk 10 finally lifts off the control edge even in the region where it projects more greatly, and in this manner releases a flow cross-section that has been increased once again. In this way, another damping characteristic line section D, which also runs in essentially linear manner, is achieved.

FIG. 14 shows three different linear characteristic line progressions a, b, and c as alternatives in the characteristic line section D. The incline at which the linear region in the characteristic line section D of the damping force characteristic line runs is dependent on the spring stiffness of the valve disk, i.e. of the valve disk package in the region of the control edge 5, 6 that projects more greatly.

From FIG. 14, it becomes evident that multiple damping characteristic lines that run degressively can be "switched one behind the other" by means of different configurations of the flow-through openings 3, 4 that are in effect in a damping direction (tension damping or pressure damping). In this way, the damping force can be very flexibly adapted to the requirements set.

The damping force progressions according to FIGS. 13 and 14 were described above only for the characteristic line progression shown in the first quadrant (tension damping). The same holds true analogously for the characteristic line progression shown in the third quadrant (pressure damping).

FIG. 15 shows the damping element according to the invention as a working piston 20 of a hydraulic vibration damper, not shown in any detail. The working piston 20 is braced to the piston rod 22 by means of a nut 21, in a manner known from the state of the art. The cut area shown in FIG. 15 passes through the second flow-through opening 4. The ring-shaped base body 2 of the working piston 20 can be clearly seen. In the case of the exemplary embodiment shown in FIG. 15, three valve disks 10 are provided at the top of the working piston 20, whereby the individual valve disks have different diameters. Because of the targeted dimensioning of the diameters of the individual valve disks 10, the stiffness of the valve assembly can be adjusted in targeted manner, in known manner. Either the same or a different valve disk assembly as on the top can be provided on the underside of the working piston 20. By means of the targeted selection of different valve disk requirements, i.e. a different valve disk structure on the top and the underside of the working piston 20, its damping behavior in the tension and pressure direction can be adjusted to be different.

FIG. 16 shows a damping element according to the invention in another embodiment, in a top view. Analogous to the representation according to FIG. 1, the viewer is looking at the exit cross-sections 3b of the flow-through openings 3 and at the entry cross-sections 4a of the flow-through openings 4. The sickle-shaped control edge 5 that surrounds the flow-through openings 3 has crosspieces 30, 31 that run essentially radially, different from the sickle-shaped control edges 6 according to FIG. 9. These crosspieces 30, 31 are an integral part of the control edge 5, i.e. the height by which they project beyond the support surface 7 increases with an increasing radial distance from the center point of the damping element also with regard to the crosspieces 30, 31. The valve disks 10, not shown in FIG. 16, therefore also lie against the crosspieces 30, 31, forming a seal.

The crosspieces 30, 31 divide the space enclosed by the sickle-shaped control edge 5 into the three partial spaces 32, 33, and 34. A groove 35 is stamped into the crosspiece 31, which connects the partial spaces 34 and 33 with one another. Without the groove 35, the pressure of the damping fluid would be applied only to the partial spaces 32 and 34 when damping fluid flows through the flow-through openings 3. Because the groove 35 is stamped into the crosspiece 31, the space consisting of the partial spaces 34 and 33 has the pressure of the damping fluid applied to it. Thus, a significantly larger area is available, because of the groove 35, which has the damping fluid that flows through the right flow-through opening in FIG. 16 applied to it. The pressure of the damping fluid thus acts on a significantly larger area, so that a clearly greater opening force acts on the valve disks 10 (not shown in FIG. 16). At a certain pressure, the valve disks 10 thus lift off from the control edge 5 significantly sooner than they would if the groove 35 were not present, and the partial spaces 34 and 33 were thus not connected with one another. Also, a clearly larger flow-off surface for the damping fluid is released by the connection of the partial spaces 34, 33 than would be the case without the groove 35.

In the sickle-shaped control edge 5' shown at the bottom of FIG. 16, in contrast, the two crosspieces 39, 40 do not have a groove. Therefore the partial spaces 36, 37, and 38, 37 that lie next to one another are not connected with one another. In the region of this control edge 5', the valve disks 10 only lift off the control edge 5' at a higher pressure than they do in the region of the control edge 5. In this manner, the damping characteristics of the damping element according to the invention can be further varied, by means of simply making one or more grooves in the crosspieces of the sickle-shaped control edges 5, 5'.

FIGS. 17a and 17b show a damping element according to the invention that is disposed within a damping force control device 41 as a so-called comfort valve 44. Such damping force control devices having a comfort valve, and their placement between the piston rod 42 and the working piston 43 of the vibration damper, as shown in FIG. 17a, are known from the state of the art. FIGS. 17a and 17b are supposed to illustrate that the damping element according to the invention can be used in flexible manner, namely not only as a working piston of a vibration damper, but also as a damping valve that interacts with a damping force control device.

FIG. 17b shows an enlarged representation of the comfort valve 44, which is disposed within a housing 45 of the damping force control device 41. The valve disks 10 that support themselves on the control edges 5 of the base body 2 can be seen well.

The base body 2 shown in FIGS. 18 to 20 is also configured as a one-piece circular disk and can be produced as a sintered body, for example. The base body 2 has a plurality of first flow-through openings 3, each having an entry cross-section 3a in a first face side of the base body, as well as a plurality of second flow-through openings 4, each having an entry cross-section 4a in an opposite, second face side of the base body 2. Similar to FIGS. 11 and 12, circular valve disks 10 can be attached at the two face sides, which disks rest against a support surface 7 disposed in the center of the base body 2, and at least partially close off exit cross-sections 3b, 4b of the flow-through openings 3, 4. The exit cross-sections are surrounded by control edges 5, 6, which form contact surfaces for the valve disks 10, and project beyond the support surface 7 as well as the entry cross-sections 3a, 4a. As in the case of the embodiments described above, the height of the control edges 5, 6 increases with an increasing radial distance from the center point of the base body 2 in the form of a circular disk. The representation in FIG. 18 and the sectional representation in FIG. 20 show that the flow-through openings 3, 4 have a cylindrical section 46 that opens into a larger exit cross-section bordered by the control edges 5, 6. The cylindrical section 46 makes a transition into the exit cross-section bordered by the control edge 5 or 6, respectively, with a constant widening 47 in cross-section. The widening 47 in cross-section is configured as a conical surface in the exemplary embodiment, but it could also be structured as a surface having a convex curvature. The exit cross-sections 3b, 4b have a kidney-shaped outline and are disposed alternating with an entry cross-section 4a or 3a, respectively, in the circumference direction. In the concrete exemplary embodiment, the base body 2 has six flow-through openings, whereby three exit cross-sections 3b, 4b bordered by control edges 5, 6 are disposed alternating with the entry cross-sections 4a, 3a. The exit cross-sections 3a, 4a form depressions 48 relative to the support surface 7; in FIG. 18 their contour is marked with cross-hatching for a better illustration. The height of the depressions 48 is evident from a comparison with FIGS. 19 and 20. The dimensions can approximately correspond to the height of the control edges, for example. From the representation in FIG. 18, it becomes clear that the depressions 48 extend all the way to the outer edge or at least to a region close to the edge of the base body 2, and fill the space between the control edges 5, 6 of adjacent exit cross-sections. They are configured in gusset shape, and delimited by an edge curved in the shape of an arc, by a cylinder section of the flow-through opening, and, on the side, by the control edges of adjacent exit cross-sections.

The control edges 5, 6 of the exit cross-sections 3b, 4b configured with a kidney-shaped base surface take on an active support function for the closing valve disks (not shown). Since the support borders on the entry cross-sections 3a, 4a, thin and easily deformable valve disks can be used, if necessary, without the risk that these deform under the effect of the fluid flowing towards the inflow cross-sections. Furthermore, the sealing length between the valve disk and the base body 2 is increased in size by means of the circumferential control edge 5, 6. Even at smaller disk opening strokes, larger amounts of the hydraulic fluid can flow off. This leads to a desired flat degression curve progression d according to the representation in FIG. 21. FIG. 21 shows the progression in the F-v diagram in comparison with the progression d' of a damping element whose exit cross-sections are configured in circular shape, and correspond to the cross-section of the flow-through openings, shown with a broken line.

The geometry of the entry cross-sections explained in FIG. 18 also has a positive effect on the damping behavior. This is shown by the representation in FIG. 22. The damping force progressions e, e' of damping elements that differ only with regard to the geometry of the entry cross-sections for the fluid are plotted. The broken-line curve shows the damping characteristic line e' of a damping element whose entry cross-sections are configured in circular shape and correspond to the cross-section of the flow-through openings, in each instance. The curve e shows the damping characteristic line of a damping element whose entry cross-sections form gusset-shaped depressions for the fluid, which extend all the way to a region close to the edge of the base body, and fill the space between the control edges of adjacent exit cross-sections. As a result of the configuration of the entry cross-sections according to the invention, the damping element keeps its degressive characteristic over a greater velocity range. The subsequent progressive increase is shifted towards higher speeds.

The invention claimed is:

1. Damping element for a vibration damper that works with hydraulic damping fluid, having
    a base body configured as a circular disk, which has a plurality of first flow-through openings, each having an entry cross-section a in a first face side of the base body, as well as a plurality of second flow-through openings, each having an entry cross-section a in an opposite, second face side of the base body,
    circular valve disks on both face sides of the base body, which rest against a support surface of the base body, disposed in the center, and at least partially close off exit cross-sections of the flow-through openings,
    whereby the exit cross-sections are surrounded by control edges, which form the contact surface for the valve disks and project beyond the support surface as well as the entry cross-sections, and whereby the height of the control edges, increases with an increasing radial distance from the center point of the base body in the form of a circular disk, wherein the flow-through openings have a flow channel section that opens into a larger exit cross-section surrounded by the control edges, and wherein the exit cross-sections have a kidney-shaped outline and are disposed alternating with an entry cross-section, in each instance, in the circumference direction.

2. Damping element according to claim 1, wherein the flow channel section is configured to be cylindrical.

3. Damping element according to claim 1, wherein the flow channel section makes a transition into the exit cross-section bordered by the control edge with a constant widening of its cross-section.

4. Damping element according to claim 3, wherein the widening in cross-section is configured as a conical surface, or a surface having a convex curvature.

5. Damping element according to claim 1, wherein the base body has flow-through openings, whereby three exit cross-sections bordered by control edges are disposed on the two face sides, alternating with three entry cross-sections.

6. Damping element according to claim 1, wherein the support surface is configured in the shape of a circular ring.

7. Damping element according to claim 1, wherein the base body has a central bore in its center point, and that the valve disks are braced against the support surface by means of a threaded bolt passed through the bore, and a nut disposed on the threaded bolt.

8. Damping element according to claim 1, wherein the base body is configured as a sintered component.

9. Damping element according to claim 1, wherein the control edges, have a local lowering along their circumference, to form a pre-opening cross-section through which flow can always take place.

10. Damping element according to claim 1, wherein the valve disks are configured as bypass disks.

11. Damping element for a vibration damper that works with hydraulic damping fluid, having
    a base body configured as a circular disk, which has a plurality of first flow-through openings, each having an entry cross-section in a first face side of the base body, as well as a plurality of second flow-through openings, each having an entry cross-section in an opposite, second face side of the base body,
    circular valve disks on both face sides of the base body, which rest against a support surface of the base body, disposed in the center, and at least partially close off exit cross-sections of the flow-through openings,
    whereby the exit cross-sections are surrounded by control edges, which form the contact surface for the valve disks and project beyond the support surface as well as the entry cross-sections, and whereby the height of the control edges increases with an increasing radial distance from the center point of the base body in the form of a circular disk, wherein the flow-through openings have a flow channel section that opens into a larger exit cross-section surrounded by the control edges, and wherein the entry cross-sections form depressions, relative to the support surface, which extend all the way to the outer edge or at least to a region of the base body close to the edge, and fill the space between the control edges of adjacent exit cross-sections.

12. Damping element according to claim 11, wherein the entry cross-section is configured as a gusset-shaped depression, which is delimited by a cylinder section of the passage opening and, on the sides, by the control edges of adjacent exit cross-sections.

13. Damping element for a vibration damper that works with hydraulic damping fluid, having
    a base body configured as a circular disk, which has a plurality of first flow-through openings, each having an entry cross-section in a first face side of the base body, as well as a plurality of second flow-through openings, each having an entry cross-section in an opposite, second face side of the base body,
    circular valve disks on both face sides of the base body, which rest against a support surface of the base body, disposed in the center, and at least partially close off exit cross-sections of the flow-through openings,
    whereby the exit cross-sections are surrounded by control edges, which form the contact surface for the valve disks and project beyond the support surface as well as the entry cross-sections, and whereby the height of the control edges increases with an increasing radial distance from the center point of the base body in the form of a circular disk, wherein the flow-through openings have a flow channel section that opens into a larger exit cross-section surrounded by the control edges, wherein the height by which the control edges of the exit cross-sections project beyond the support surface of the base body increases differently from flow-through opening to flow-through opening on at least one face side of the base body, in the radial direction, and/or wherein the height progressions of the control edges at the exit cross-sections of the first flow-through openings and of the second flow-through openings are different.

* * * * *

UNITED STATES PATENT AND TRADEMARK OFFICE
CERTIFICATE OF CORRECTION

| | |
|---|---|
| PATENT NO. | : 8,235,188 B2 |
| APPLICATION NO. | : 12/227464 |
| DATED | : August 7, 2012 |
| INVENTOR(S) | : Kais |

It is certified that error appears in the above-identified patent and that said Letters Patent is hereby corrected as shown below:

In particular, in Column 13, line 20 (Line 5 of Claim 1) after "cross-section", please delete: "a".

In Column 13, line 32 (Line 17 of Claim 1) after the word "edges", please delete: ",".

Signed and Sealed this
Sixth Day of November, 2012

David J. Kappos
*Director of the United States Patent and Trademark Office*